(12) United States Patent
Usukura

(10) Patent No.: US 10,606,113 B2
(45) Date of Patent: Mar. 31, 2020

(54) DISPLAY DEVICE

(71) Applicant: SHARP KABUSHIKI KAISHA, Sakai, Osaka (JP)

(72) Inventor: Naru Usukura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/235,676

(22) Filed: Dec. 28, 2018

(65) Prior Publication Data

US 2019/0212608 A1 Jul. 11, 2019

(30) Foreign Application Priority Data

Jan. 10, 2018 (JP) ................................. 2018-001949

(51) Int. Cl.
*G02F 1/1335* (2006.01)
*G02F 1/1334* (2006.01)

(52) U.S. Cl.
CPC ...... *G02F 1/133504* (2013.01); *G02F 1/1334* (2013.01); *G02F 1/133528* (2013.01); *G02F 1/133536* (2013.01); *G02F 1/133553* (2013.01); *G02F 2001/133601* (2013.01)

(58) Field of Classification Search
None
See application file for complete search history.

(56) References Cited

U.S. PATENT DOCUMENTS

| | | | | |
|---|---|---|---|---|
| 5,969,850 A | * | 10/1999 | Harrold | G02B 27/2214 359/320 |
| 2010/0020265 A1 | * | 1/2010 | Senoue | G02F 1/13362 349/62 |
| 2012/0092395 A1 | * | 4/2012 | Seetzen | G09G 3/3426 345/690 |
| 2012/0169791 A1 | * | 7/2012 | Whitehead | G02F 1/133603 345/690 |
| 2012/0293535 A1 | * | 11/2012 | Nozawa | G02F 1/133603 345/589 |
| 2013/0335682 A1 | * | 12/2013 | Gilbert | G09G 3/3426 349/85 |
| 2015/0009307 A1 | * | 1/2015 | Lee | G02F 1/133504 348/54 |

(Continued)

FOREIGN PATENT DOCUMENTS

WO 2015/141350 A1 9/2015

*Primary Examiner* — Ryan Crockett
(74) *Attorney, Agent, or Firm* — ScienBiziP, P.C.

(57) ABSTRACT

In the display device, a display panel, a linearly polarized light reflection layer, and a light scattering layer are configured to satisfy at least two states selected from the group consisting of: a state where the display panel includes a display surface with divided regions involving a display region and a non-display region, a state where the linearly polarized light reflection layer includes divided regions involving first and second reflection regions, and a state where the light scattering layer includes divided regions involving a light scattering region and a light transmitting region. At least two regions are superimposed on each other. The regions are selected from the group consisting of one of the display region and the non-display region, one of the first and second reflection regions, and one of the light scattering region and the light transmitting region and satisfy the at least two states.

8 Claims, 4 Drawing Sheets

(56) References Cited

U.S. PATENT DOCUMENTS

| | | | |
|---|---|---|---|
| 2016/0026039 A1* | 1/2016 | Sakai | G02F 1/133555 |
| | | | 345/1.3 |
| 2016/0356943 A1* | 12/2016 | Choi | G02F 1/1323 |
| 2017/0082895 A1 | 3/2017 | Sakai et al. | |
| 2017/0329149 A1* | 11/2017 | Fattal | G02F 1/1334 |
| 2018/0292712 A1* | 10/2018 | Kishimoto | C09K 11/621 |
| 2019/0155097 A1* | 5/2019 | Usukura | G02F 1/133536 |
| 2019/0285931 A9* | 9/2019 | Gilbert | H04N 13/324 |
| 2019/0331945 A1* | 10/2019 | Fang | G02F 1/13306 |

\* cited by examiner

DISPLAY DEVICE

CROSS-REFERENCE TO RELATED APPLICATIONS

The present application claims priority under 35 U.S.C. § 119 to Japanese Patent Application No. 2018-001949 filed on Jan. 10, 2018, the contents of which are incorporated herein by reference in their entirety.

BACKGROUND OF THE INVENTION

Field of the Invention

The present invention relates to display devices. In particular, the present invention relates to a display device favorably usable even in a non-display state.

Description of Related Art

Display devices such as liquid crystal display devices only present a black screen in a non-display state and thus require improvement in designability. Here, proposed is a mirror display including a half mirror layer disposed on the front surface side of a display device, thereby imparting a function as a mirror to the display device (e.g., WO 2015/141350).

BRIEF SUMMARY OF THE INVENTION

WO 2015/141350 discloses a mirror display including, in the following order: a liquid crystal display device, a reflective polarizer as a half mirror layer, and a light-diffusing member. WO 2015/141350 states that such a mirror display can match the surrounding environment having diffusely reflecting surfaces in the mirror mode. However, the present inventor founds through studies that, in the mirror display, there is still room for improvement in providing additional display while assuring the designability.

The present invention has been made under the current situation in the art and aims to provide a display device capable of providing additional display while assuring the designability.

The present inventor has made various studies on display devices capable of providing additional display while assuring the designability, and found that additional display can be provided by, in a stack of a display panel, a linearly polarized light reflection layer, and a light scattering layer, dividing at least two of these members into regions with different functions and operating these regions together. The inventor thus arrived at a solution to the above problem, completing the present invention.

In other words, an aspect of the present invention may be a display device including, in the following order: a display panel, a linearly polarized light reflection layer, and a light scattering layer, the display panel, the linearly polarized light reflection layer, and the light scattering layer being configured to satisfy at least two states selected from the group consisting of: (1) a state where the display panel includes a display surface with divided regions involving a display region emitting display light and a non-display region emitting no display light, (2) a state where the linearly polarized light reflection layer includes divided regions involving a first reflection region reflecting first linearly polarized light and a second reflection region reflecting second linearly polarized light having a different wavelength from the first linearly polarized light, and (3) a state where the light scattering layer includes divided regions involving a light scattering region scattering incident light and a light transmitting region transmitting incident light, at least two regions being superimposed on each other, the regions being selected from the group consisting of one of the display region and the non-display region, one of the first reflection region and the second reflection region, and one of the light scattering region and the light transmitting region and satisfying the at least two states.

The present invention can provide a display device capable of providing additional display while assuring the designability.

DETAILED DESCRIPTION OF THE INVENTION

The present invention is described below in more detail based on embodiments with reference to the drawings. The embodiments, however, are not intended to limit the scope of the present invention. The configurations employed in the embodiments may appropriately be combined or modified within the spirit of the present invention.

The following embodiments exemplify cases where the display panel is a liquid crystal display panel, but the display panel may be of any type. Examples of the display panel include, in addition to a liquid crystal display panel, an organic electroluminescence display panel and a plasma display panel.

The phrase "X to Y" herein means X or more and Y or less.

Embodiment 1

Figure 1:
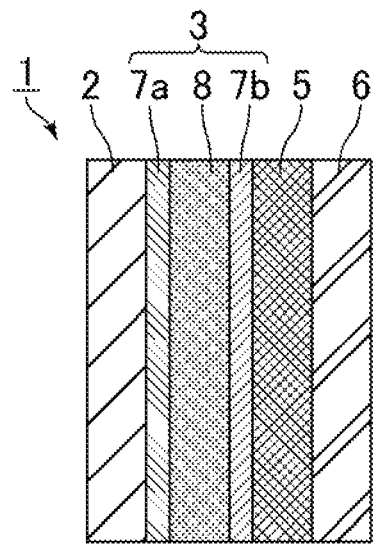
FIG. 1 is a schematic cross-sectional view of a display device of Embodiment 1.
Figure 2:
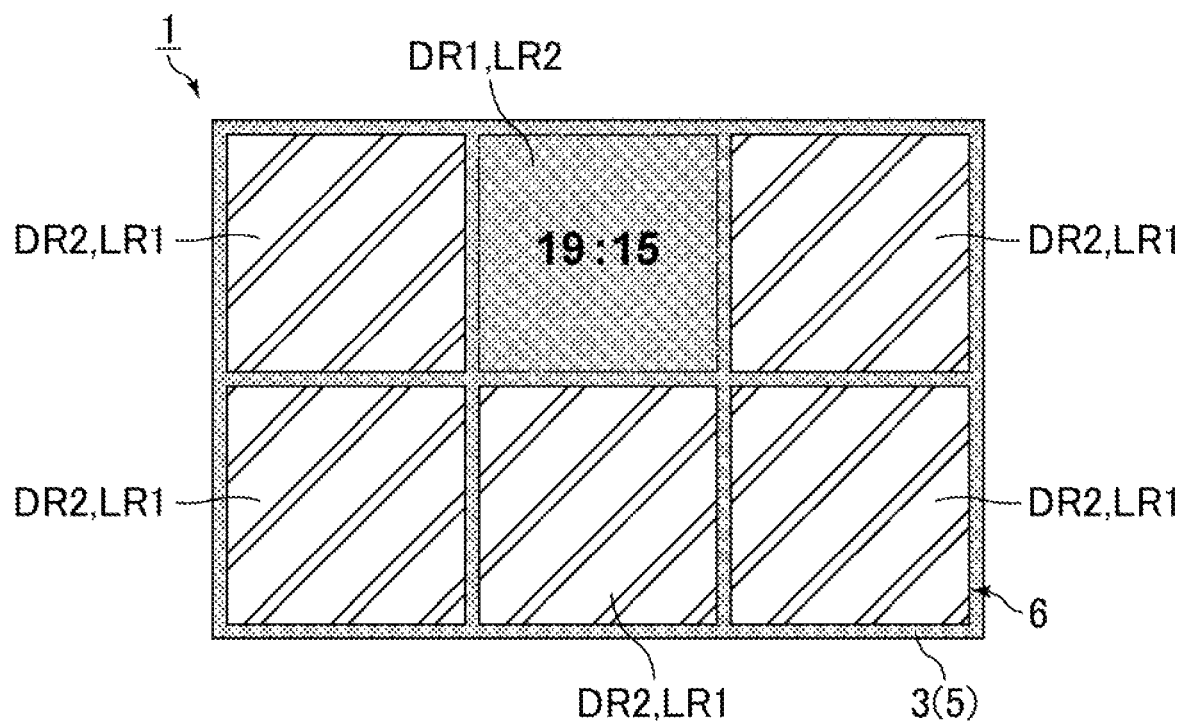
FIG. 2 is a schematic plan view of the display device of Embodiment 1.

The following is description of a display device of Embodiment 1 with reference to FIGS. 1 and 2. FIG. 1 is a schematic cross-sectional view of a display device of Embodiment 1. FIG. 2 is a schematic plan view of the display device of Embodiment 1.

A display device 1 includes, in the following order: a backlight 2, a liquid crystal display panel 3, a linearly polarized light reflection layer 5, and a light scattering layer 6.

<Liquid Crystal Display Panel>

The liquid crystal display panel 3 includes, in the order from the backlight 2 side to the linearly polarized light reflection layer 5 side, an absorptive polarizer 7a, a liquid crystal cell 8, and an absorptive polarizer 7b.

The absorptive polarizers 7a and 7b each may be a product formed by dyeing a polyvinyl alcohol (PVA) film with an anisotropic material such as an iodine complex (or dye) to adsorb the anisotropic material on the PVA film and then stretch-aligning the film.

The liquid crystal cell 8 may be a cell including paired substrates and a liquid crystal layer held between the substrates. Examples of the combination for the substrates include a conventionally known combination of thin film transistor array substrate and a color filter substrate.

The liquid crystal display panel 3 includes a display surface with divided regions involving a display region DR1 emitting display light and non-display regions DR2 emitting no display light. Such a state may be achieved by using a local dimming backlight as the backlight 2. The local dimming backlight includes light sources (light emitting regions) in respective divided regions, and the light sources can be separately turned on (with a certain luminance) or off for each region. For example, in the liquid crystal display panel 3, a region superimposed on the light-on region of the local dimming backlight can function as the display region DR1 emitting linearly polarized light (display light) to the linearly polarized light reflection layer 5 side of the liquid crystal display panel 3 (absorptive polarizer 7b). Meanwhile, a region superimposed on the light-off region of the local dimming backlight can function as the non-display region DR2 emitting no linearly polarized light (display light) to the linearly polarized light reflection layer 5 side of the liquid crystal display panel 3 (absorptive polarizer 7b). Here, the non-display region DR2 in the display surface means a region switched to the non-display state in the display surface and excludes a region always in the non-display state in the display surface (e.g., a region including a black matrix) and a frame region surrounding the display surface.

This method enables the liquid crystal display panel 3 to operate certain region(s) as the display region DR1 and the other region(s) as the non-display region DR2 simultaneously in the same display surface. The liquid crystal display panel 3 may be any one that achieves such a state, and thus the display surface has no need to always include divided regions involving the display region DR1 and the non-display region DR2.

<Linearly Polarized Light Reflection Layer>

The linearly polarized light reflection layer 5 reflects linearly polarized incident light vibrating in the direction parallel to the reflection axis and transmits linearly polarized incident light vibrating in the direction perpendicular to the reflection axis (in the direction parallel to the transmission axis).

Examples of the linearly polarized light reflection layer 5 include reflective polarizers such as a wire grid reflective polarizer and a multilayer reflective polarizer.

Although, in the present embodiment, the linearly polarized light reflection layer 5 includes no divided regions involving two regions with different reflection wavelength properties, the linearly polarized light reflection layer 5 may include divided regions involving two regions with different reflection wavelength properties as in Embodiment 2 described later.

<Light Scattering Layer>

The light scattering layer 6 includes divided regions involving light scattering regions LR1 scattering incident light and a light transmitting region LR2 transmitting incident light. Here, the light transmitting region LR2 means, differently from the light scattering region LR1, a region transmitting incident light without scattering. Preferably, the light scattering layer 6 includes polymer dispersed liquid crystals (PDLC) at least in the light scattering region LR1.

The polymer dispersed liquid crystals include microdroplets of liquid crystals dispersed in a polymer matrix. The polymer dispersed liquid crystals may be formed by irradiating a mixture of nematic liquid crystals and a photocurable resin with light and thereby polymerizing the photocurable resin.

The function of the polymer dispersed liquid crystals is controlled by applying or not applying voltage to a pair of electrodes holding the polymer dispersed liquid crystals in between from the linearly polarized light reflection layer 5 side and the side remote from the linearly polarized light reflection layer 5.

In the polymer dispersed liquid crystals in the no-voltage-applied state (the state where no voltage is applied between the paired electrodes), dispersed liquid crystals (microdroplets) with different alignment vectors face different directions to allow scattering of incident light at the interfaces between the liquid crystals. Accordingly, in the light scattering layer 6, the region including the polymer dispersed liquid crystals with no voltage applied can function as the light scattering region LR1.

In contrast, in the polymer dispersed liquid crystals in the voltage-applied state (the state where voltage is applied between the paired electrodes), the liquid crystals and the polymer have similar refractive indices to transmit incident light. Accordingly, in the light scattering layer 6, the region including the polymer dispersed liquid crystals with voltage applied can function as the light transmitting region LR2. In other words, the light scattering layer 6 may include the polymer dispersed liquid crystals in the light transmitting region LR2.

As described, a pair of electrodes for applying voltage to the polymer dispersed liquid crystals is disposed in respective divided regions with the polymer dispersed liquid crystals, and whether voltage is applied to the electrodes or not is controlled for each region. This enables the light scattering layer 6 to operate certain region(s) as the light scattering region LR1 and the other region(s) as the light transmitting region LR2 simultaneously in the same plane. The light scattering layer 6 may be any one that achieves such a state and thus has no need to always include divided regions involving the light scattering region LR1 and the light transmitting region LR2.

Alternatively, in the light scattering layer 6, the region without the polymer dispersed liquid crystals may function as the light transmitting region LR2. In other words, the light scattering layer 6 may include no polymer dispersed liquid crystals in the light transmitting region LR2.

The light scattering layer 6 may include, in addition to the polymer dispersed liquid crystals, for example, a light diffusion plate (e.g., a conventionally known product in which beads are kneaded in a substrate) in the light scattering region LR1.

In the display device 1, the display region DR1 and the light transmitting region LR2 are superimposed on each other and the non-display regions DR2 and the light scattering regions LR1 are superimposed on each other. The present embodiment enables the display device 1 to display an image or the like provided by the liquid crystal display panel 3 in the region where the display region DR1 and the light transmitting region LR2 are superimposed on each other (display part). In addition, the display device 1 appears colored according to the reflection color in the regions where the non-display regions DR2 and the light scattering regions LR1 are superimposed on each other to match the surrounding environment (e.g., the casing of the display device 1) (non-display part). Operation principles of the display device 1 are described as follows.

<Display Part>

Figure 3:
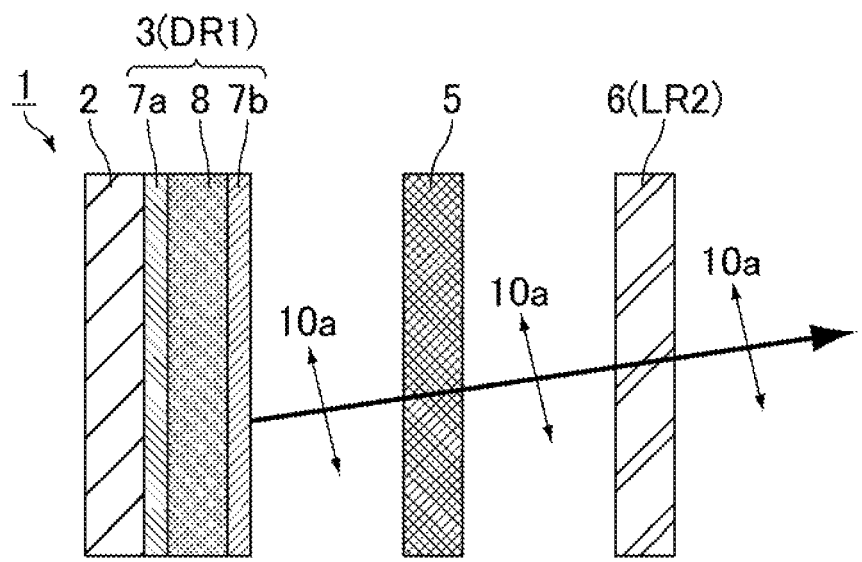
FIG. 3 is a schematic cross-sectional view for illustrating the operation principle of a display part of the display device of Embodiment 1.

FIG. 3 is a schematic cross-sectional view for illustrating the operation principle of a display part of the display device of Embodiment 1. In FIG. 3, the liquid crystal display panel 3, the linearly polarized light reflection layer 5, and the light scattering layer 6 are illustrated with spaces therebetween for convenience.

In the display part of the display device 1, display light is emitted from the display region DR1 of the liquid crystal display panel 3. Specifically, as shown in FIG. 3, light emitted from the backlight 2 passes through the liquid crystal display panel 3 (absorptive polarizer 7b) to the linearly polarized light reflection layer 5 side as linearly polarized light 10a (display light: an image or the like provided by the liquid crystal display panel 3). The linearly polarized light 10a vibrates in the direction parallel to the transmission axis of the absorptive polarizer 7b.

Here, the transmission axis of the linearly polarized light reflection layer 5 is set to be parallel to the vibration direction of the linearly polarized light 10a. Thus, the linearly polarized light 10a incident on the linearly polarized light reflection layer 5 from the liquid crystal display panel 3 passes through the linearly polarized light reflection layer 5.

Then, the linearly polarized light 10a having passed through the linearly polarized light reflection layer 5 passes through the light transmitting region LR2 of the light scattering layer 6 and is emitted from the display device 1 in the end.

Thus, in the display part of the display device 1, emitted light of the display device 1 is viewed, which allows an image or the like provided by the liquid crystal display panel 3 to be visible.

<Non-Display Part>

Figure 4:
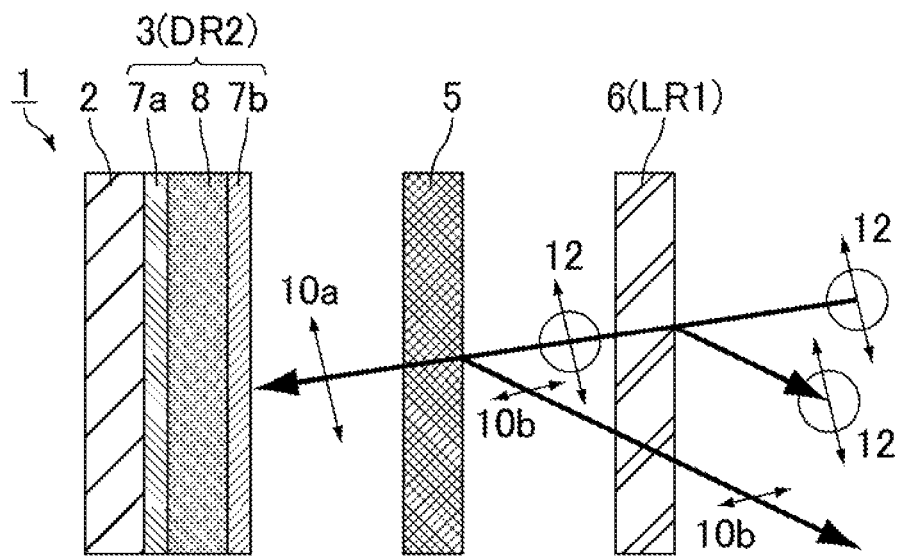
FIG. 4 is a schematic cross-sectional view for illustrating the operation principle of a non-display part of the display device of Embodiment 1.

FIG. 4 is a schematic cross-sectional view for illustrating the operation principle of a non-display part of the display device of Embodiment 1. In FIG. 4, the liquid crystal display panel 3, the linearly polarized light reflection layer 5, and the light scattering layer 6 are illustrated with spaces therebetween for convenience.

In the non-display part of the display device 1, no display light is emitted from the non-display region DR2 of the liquid crystal display panel 3. Meanwhile, as shown in FIG. 4, external light 12 (unpolarized light) incident on the light scattering layer 6 side of the display device 1 is scattered by the light scattering region LR1 of the light scattering layer 6 toward the linearly polarized light reflection layer 5 side and the side remote from the linearly polarized light reflection layer 5.

Here, the transmission axis of the linearly polarized light reflection layer 5 is set to be parallel to the vibration direction of the linearly polarized light 10a while the reflection axis of the linearly polarized light reflection layer 5 is set to be parallel to the vibration direction of linearly polarized light 10b (linearly polarized light vibrating in the direction perpendicular to the vibration direction of the linearly polarized light 10a). Thus, the linearly polarized light 10a, which is included in the external light 12 and has been scattered toward the linearly polarized light reflection layer 5 side, passes through the linearly polarized light reflection layer 5. On the other hand, the linearly polarized light 10b, which is also included in the external light 12 and has been scattered toward the linearly polarized light reflection layer 5 side, is reflected by the linearly polarized light reflection layer 5 to the light scattering layer 6 side.

Then, the linearly polarized light 10a having passed through the linearly polarized light reflection layer 5 is appropriately absorbed by the liquid crystal display panel 3 and the backlight 2. Meanwhile, the linearly polarized light 10b reflected by the linearly polarized light reflection layer 5 to the light scattering layer 6 side is scattered by the light scattering region LR1 of the light scattering layer 6.

Accordingly, in the non-display part of the display device 1, reflected light (scattered light) of the display device 1 is viewed and thus the display device 1 appears colored according to the reflection color. Additionally, the non-display part of the display device 1 achieves display of a reflection color with a high reflectance (i.e., sufficiently bright color) by the effect of the linearly polarized light reflection layer 5. Moreover, the non-display part of the display device 1 can match the surrounding environment having diffusely reflecting surfaces by the effect of the light scattering layer 6, thereby achieving excellent designability.

FIG. 2 exemplifies a configuration where the liquid crystal display panel 3 and the light scattering layer 6 each include six quadrangular (substantially square) divided regions arranged in a matrix of two rows and three columns. The number, shape, and arrangement of the divided regions are not particularly limited. For example, the number of the divided regions may be larger than six, and the divided regions may have an abnormal shape excepting a quadrangular shape and may be arranged in a matrix excepting a matrix with two rows and three columns.

In FIG. 2, in order to simply illustrate the positional relationship between the liquid crystal display panel 3 (linearly polarized light reflection layer 5) and the light scattering layer 6, their frames are shifted from each other, but the frames may be at the same position. The same shall apply to FIGS. 5 to 7 described later.

Embodiment 2

Figure 5:
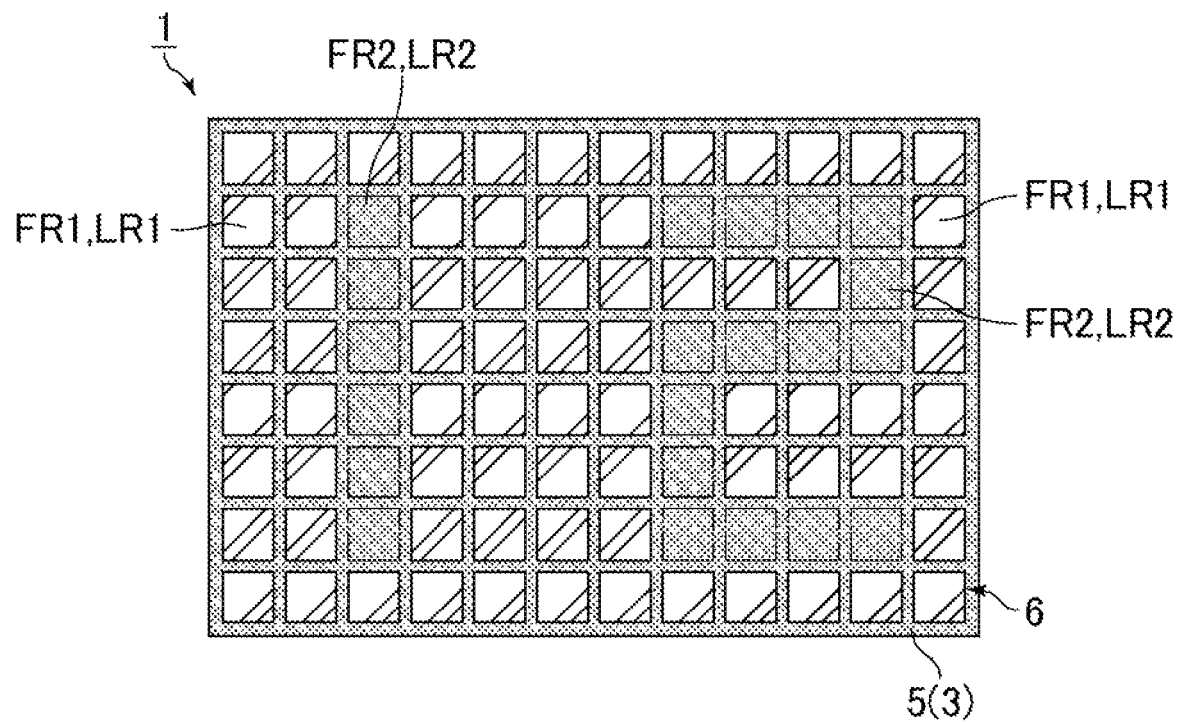
FIG. 5 is a schematic plan view of a display device of Embodiment 2.

The following is description of a display device of Embodiment 2 with reference to FIG. 5. FIG. 5 is a schematic plan view of a display device of Embodiment 2. The configuration of the display device of Embodiment 2 is the same as that of the display device of Embodiment 1 except that the linearly polarized light reflection layer includes divided regions and the light scattering layer includes divided regions. Accordingly, the description of the same respects is omitted here.

The linearly polarized light reflection layer 5 includes divided regions involving a first reflection region FR1 reflecting first linearly polarized light and a second reflection region FR2 reflecting second linearly polarized light having a different wavelength from the first linearly polarized light. This state can be achieved by, for example, the following methods.

A first method may be using a wire grid reflective polarizer. The wire grid reflective polarizer can have various reflection wavelength properties by adjusting the pitch, the aspect ratio, or the like of the wire grid. Therefore, the linearly polarized light reflection layer 5 can have divided regions involving the first reflection region FR1 and the second reflection region FR2 by varying the pitch, the aspect ratio, or the like of the wire grid in the plane. Such a wire grid reflective polarizer may be formed before or after bonding the wire grid reflective polarizer to the liquid crystal display panel 3 (absorptive polarizer 7b).

A second method may be using a dielectric film included in a multilayer reflective polarizer. First, a first dielectric film with a reflection wavelength property corresponding to the first linearly polarized light and a second dielectric film with a reflection wavelength property corresponding to the second linearly polarized light are separately prepared. The first dielectric film and the second dielectric film are punched to form prescribed patterns. Then, the punched patterns of the first dielectric film and the second dielectric film are assembled to form an integrated film such that the second dielectric film is disposed in the punched region of the first dielectric film and the first dielectric film is disposed in the punched region of the second dielectric film. Thereby, the region with the first dielectric film functions as the first reflection region FR1 and the region with the second dielectric film functions as the second reflection region FR2. The non-punched regions of the first dielectric film and the second dielectric film may overlap each other. The overlapped region has reflection wavelength properties corresponding to both of the first linearly polarized light and the second linearly polarized light. The wavelength band corresponding to the reflection wavelength property can be narrowed down using the second method as compared with using the first method.

The above methods enable the linearly polarized light reflection layer 5 to operate certain region(s) as the first reflection region FR1 and the other region(s) as the second reflection region FR2 simultaneously in the same plane. This enables the linearly polarized light reflection layer 5 to provide a pattern with two reflection colors.

In the display device 1, the first reflection regions FR1 and the light scattering regions LR1 are superimposed on each other and the second reflection regions FR2 and the light transmitting regions LR2 are superimposed on each other. Here, the display surface of the liquid crystal display panel 3 has the non-display region DR2 only. In the present embodiment, in the non-display state of the display device 1, a pattern such as letter(s) emerges in the light scattering regions LR1 or the light transmitting regions LR2 (in FIG. 5, light transmitting regions LR2). Furthermore, the reflection color provided by the linearly polarized light reflection layer 5 appears differently between in the first reflection regions FR1 superimposed on the light scattering regions LR1 and in the second reflection regions FR2 superimposed on the light transmitting regions LR2. Accordingly, in the non-display state of the display device 1, a pattern such as letter(s) emerges more clearly.

Figure 6:
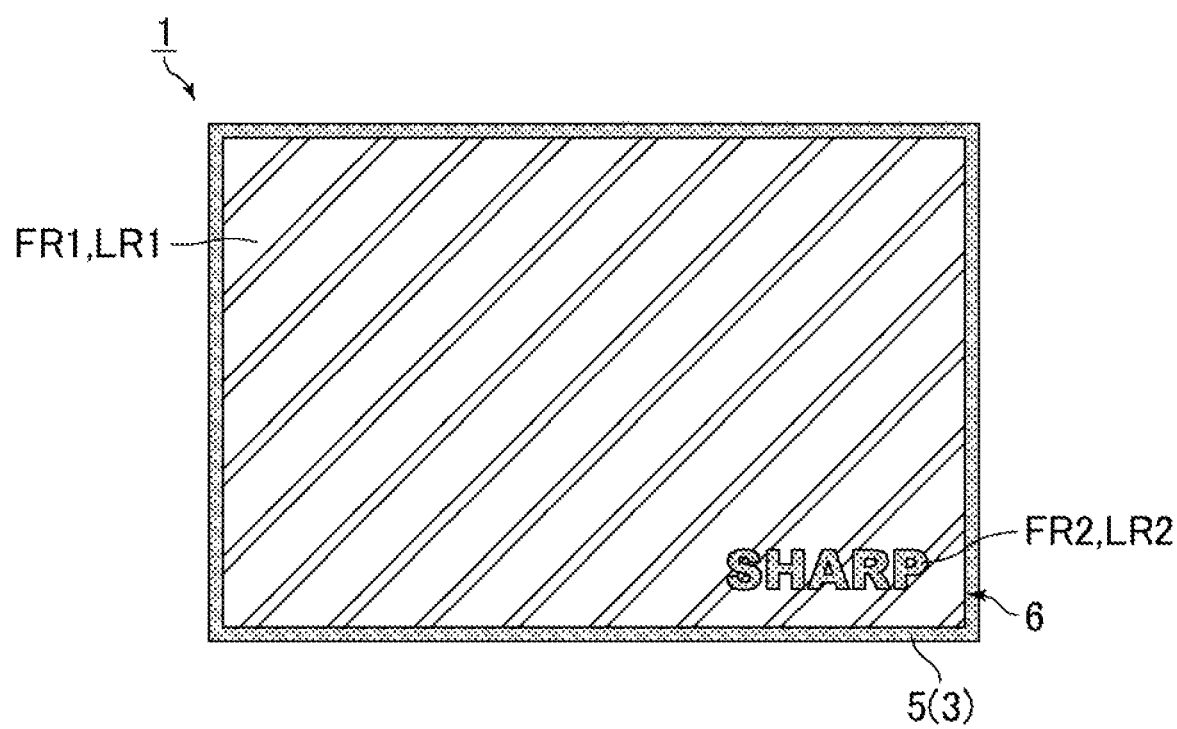
FIG. 6 is a schematic plan view of a display device of a modified example of Embodiment 2.

In the present embodiment, the light scattering layer 6 includes the polymer dispersed liquid crystals in both of the light scattering region LR1 and the light transmitting region LR2 (a pair of electrodes is disposed in respective divided regions with the polymer dispersed liquid crystals). As a modified example, as shown in FIG. 6, the region including the polymer dispersed liquid crystals may be operated as the light scattering region LR1 and the region without the polymer dispersed liquid crystals may be operated as the light transmitting region LR2. FIG. 6 is a schematic plan view of a display device of a modified example of Embodiment 2. Also in the present modified example in the non-display state of the display device 1, a pattern such as letter(s) emerges in the light scattering region LR1 or the light transmitting region LR2 of the light scattering layer 6 (in FIG. 6, the light transmitting region LR2).

In the present embodiment and the modified example thereof, the linearly polarized light reflection layer 5 includes divided regions with the first reflection region FR1 and the second reflection region FR2 only. However, the divided regions may further include at least one reflection region reflecting linearly polarized light with a wavelength different from those of the first linearly polarized light and the second linearly polarized light, in addition to the first reflection region FR1 and the second reflection region FR2. Thereby, the linearly polarized light reflection layer 5 can provide a pattern with at least three reflection colors.

Although the liquid crystal display panels 3 of the present embodiment and the modified example thereof each include a display surface having the non-display region DR2 only, the display surface may include divided regions involving the display region DR1 and the non-display region DR2 as in Embodiment 1.

Embodiment 3

Figure 7:
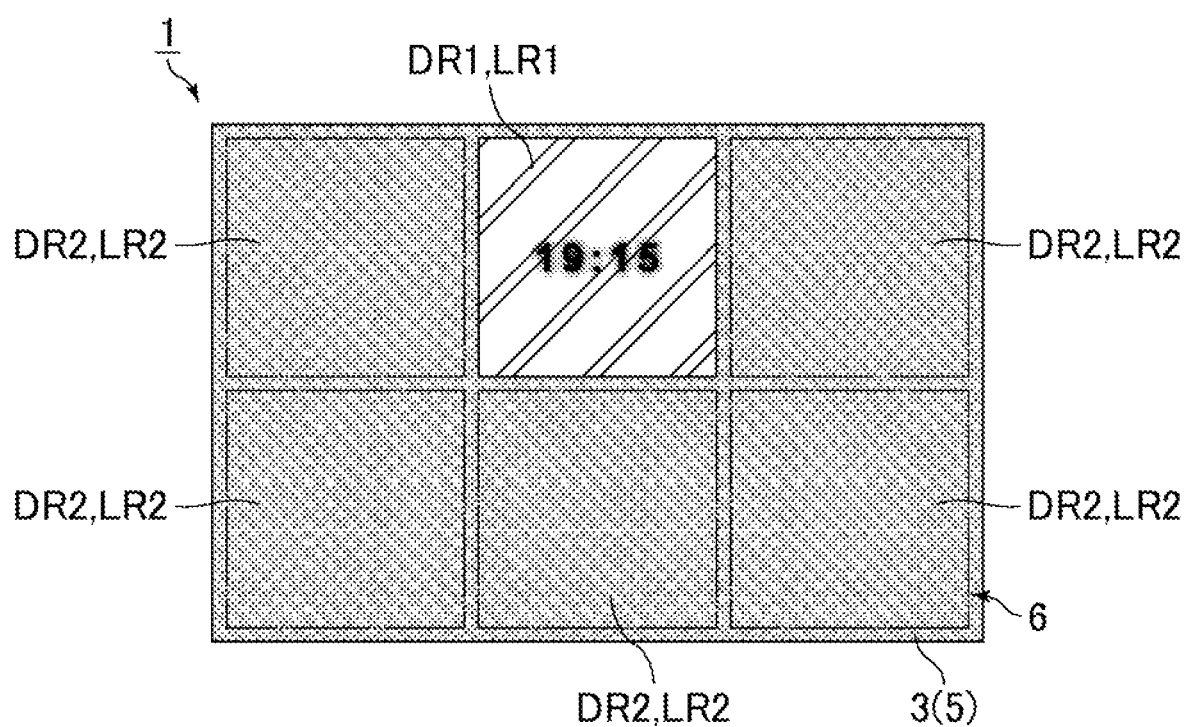
FIG. 7 is a schematic plan view of a display device of Embodiment 3.

The following is description of a display device of Embodiment 3 with reference to FIG. 7. FIG. 7 is a schematic plan view of a display device of Embodiment 3. The configuration of the display device of Embodiment 3 is the same as that of the display device of Embodiment 1 except that the positional relationship between the regions composing the display panel and the regions composing the light scattering layer is different. Accordingly, the description of the same respects is omitted here.

In the display device 1, the display region DR1 and the light scattering region LR1 are superimposed on each other and the non-display region DR2 and the light transmitting region LR2 are superimposed on each other. The linearly polarized light reflection layer 5 is not divided into regions involving two regions with different reflection wavelength properties (e.g., the linearly polarized light reflection layer 5 has the first reflection region FR1 only). In the present embodiment, in a region where the display region DR1 and the light scattering region LR1 are superimposed on each other, an image or the like provided by the liquid crystal display panel 3 is visible although it is slightly blurred due to the act (scattering) of the light scattering region LR1 of the light scattering layer 6.

Although, in the present embodiment, the linearly polarized light reflection layer 5 is not divided into regions involving two regions with different reflection wavelength properties, the linearly polarized light reflection layer 5 may include divided regions involving the first reflection region FR1 and the second reflection region FR2 as in Embodiment 2.

Although Embodiments 1 to 3 exemplify a case where display light emitted from the liquid crystal display panel 3 is linearly polarized light, display light may be, other than linearly polarized light, circularly polarized light, elliptically polarized light, or the like. The display light may be in such a polarization state as described above or in the unpolarized state where various polarization states are randomly included.

[Additional Remarks]

An aspect of the present invention may be a display device including, in the following order: a display panel, a linearly polarized light reflection layer, and a light scattering layer, the display panel, the linearly polarized light reflection layer, and the light scattering layer being configured to satisfy at least two states selected from the group consisting of: (1) a state where the display panel includes a display surface with divided regions involving a display region emitting display light and a non-display region emitting no display light, (2) a state where the linearly polarized light reflection layer includes divided regions involving a first reflection region reflecting first linearly polarized light and a second reflection region reflecting second linearly polarized light having a different wavelength from the first linearly polarized light, and (3) a state where the light scattering layer includes divided regions involving a light scattering region scattering incident light and a light transmitting region transmitting incident light, at least two regions being superimposed on each other, the regions being selected from the group consisting of one of the display region and the non-display region, one of the first reflection region and the second reflection region, and one of the light scattering region and the light transmitting region and satisfying the at least two states. This aspect achieves a display device capable of providing additional display while assuring the designability.

The display panel may include the display surface with divided regions involving the display region and the non-display region, the light scattering layer may include divided regions involving the light scattering region and the light transmitting region, the display region and the light transmitting region may be superimposed on each other, and the non-display region and the light scattering region may be superimposed on each other. This enables the display device to display an image or the like provided by the liquid crystal display panel in a region where the display region and the light transmitting region are superimposed on each other (display part). In addition, the display device appears colored according to the reflection color in a region where the non-display region and the light scattering region are superimposed on each other to match the surrounding environment (e.g., the casing of the display device) (non-display part).

The linearly polarized light reflection layer may include divided regions involving the first reflection region and the second reflection region, the light scattering layer may include divided regions involving the light scattering region and the light transmitting region, the first reflection region and the light scattering region may be superimposed on each other, and the second reflection region and the light transmitting region may be superimposed on each other. This enables a pattern such as letter(s) to emerge clearly in a region where the first reflection region and the light scattering region are superimposed on each other or a region where the second reflection region and the light transmitting region are superimposed on each other.

The display panel may include the display surface with divided regions involving the display region and the non-display region, the light scattering layer may include divided regions involving the light scattering region and the light transmitting region, the display region and the light scattering region may be superimposed on each other, and the non-display region and the light transmitting region may be superimposed on each other. This enables an image or the like provided by the display panel to be visible in a region where the display region and the light scattering region are superimposed on each other although the image or the like is slightly blurred.

The light scattering layer may include a polymer dispersed liquid crystals at least in the light scattering region. This enables effective use of at least the light scattering region of the light scattering layer.

The light scattering layer may include the polymer dispersed liquid crystals in the light transmitting region. This enables use of the region with the polymer dispersed liquid crystals as the light transmitting region in the light scattering layer.

The light scattering layer may include no polymer dispersed liquid crystals in the light transmitting region. This enables use of the region without the polymer dispersed liquid crystals as the light transmitting region in the light scattering layer.

The display panel may be a liquid crystal display panel. This enables the present invention to be applied to the case using a liquid crystal display panel as the display panel.

What is claimed is:

1. A display device comprising, in the following order:
   a display panel,
   a linearly polarized light reflection layer, and
   a light scattering layer,
   the display panel, the linearly polarized light reflection layer, and the light scattering layer being configured to satisfy at least two states selected from the group consisting of:
   (1) a state where the display panel includes a display surface with divided regions involving a display region emitting display light and a non-display region emitting no display light,
   (2) a state where the linearly polarized light reflection layer includes divided regions involving a first reflection region reflecting first linearly polarized light and a second reflection region reflecting second linearly polarized light having a different wavelength from the first linearly polarized light, and
   (3) a state where the light scattering layer includes divided regions involving a light scattering region scattering incident light and a light transmitting region transmitting incident light,
   at least two regions being superimposed on each other, the regions being selected from the group consisting of one of the display region and the non-display region, one of the first reflection region and the second reflection region, and one of the light scattering region and the light transmitting region and satisfying the at least two states.

2. The display device according to claim 1,
   wherein the display panel includes the display surface with divided regions involving the display region and the non-display region,
   the light scattering layer includes divided regions involving the light scattering region and the light transmitting region,
   the display region and the light transmitting region are superimposed on each other, and
   the non-display region and the light scattering region are superimposed on each other.

3. The display device according to claim 1,
   wherein the linearly polarized light reflection layer includes divided regions involving the first reflection region and the second reflection region,
   the light scattering layer includes divided regions involving the light scattering region and the light transmitting region,
   the first reflection region and the light scattering region are superimposed on each other, and
   the second reflection region and the light transmitting region are superimposed on each other.

4. The display device according to claim 1,
   wherein the display panel includes the display surface with divided regions involving the display region and the non-display region,
   the light scattering layer includes divided regions involving the light scattering region and the light transmitting region,
   the display region and the light scattering region are superimposed on each other, and the non-display region and the light transmitting region are superimposed on each other.

5. The display device according to claim 1, wherein the light scattering layer includes polymer dispersed liquid crystals at least in the light scattering region.

6. The display device according to claim 5, wherein the light scattering layer includes the polymer dispersed liquid crystals in the light transmitting region.

7. The display device according to claim 5, wherein the light scattering layer includes no polymer dispersed liquid crystals in the light transmitting region.

8. The display device according to claim 1, wherein the display panel is a liquid crystal display panel.

* * * * *